② United States Patent [11] 3,593,279

[72] Inventor Gerhard Pumpe
Munich, Germany
[21] Appl. No. 671,264
[22] Filed Sept. 28, 1967
[45] Patented July 13, 1971
[73] Assignee Siemens Aktiengesellschaft
Berlin and Munich, Germany
[32] Priority Sept. 30, 1966
[33] Germany
[31] S 106 281

[54] METHOD AND CIRCUIT THEREFOR FOR EVALUATION OF RECEIVED CODED MESSAGES

17 Claims, 6 Drawing Figs.

[52] U.S. Cl. .................... 340/146.1
[51] Int. Cl. .................... H04b 1/66, H04l 1/04
[50] Field of Search .................... 340/146.1; 235/153

[56] References Cited

UNITED STATES PATENTS

| | | | |
|---|---|---|---|
| 2,495,705 | 1/1950 | Devaux | 340/146.1 UX |
| 3,260,994 | 6/1966 | Sturdy | 340/146.1 |
| 3,459,927 | 8/1969 | Geller | 235/153 |

*Primary Examiner*—Malcolm A. Morrison
*Assistant Examiner*—R. Stephen Dildine, Jr.
*Attorney*—Birch, Swindler, McKie & Beckett

ABSTRACT: A method and circuit therefor to evaluate successive received individual coded information signals identified by predetermined combinations of signals selected from a plurality of fixed frequency signals. Hold signals are transmitted between successive individual coded information signals and are evaluated at the receiver which, in the absence thereof, produces a corresponding error indication signal that may be applied to the transmitter. The hold signals comprise a particular combination of signals selected from said plurality of fixed frequency signals, and individual signals comprising said particular combination also comprise some of the predetermined combinations of signals corresponding to the individual coded information signals.

METHOD AND CIRCUIT THEREFOR FOR EVALUATION OF RECEIVED CODED MESSAGES

BACKGROUND OF THE INVENTION

1. Field of the Invention

The invention relates to a method and circuit therefor wherein received coded information signals are evaluated to determine if they are accurate. Individual coded information signals are identified by particular combinations of signals selected from a plurality of fixed frequency signals. Hold signals are transmitted between successive individual coded information signals, and must be evaluated as such at the receiver to provide an indication that the last transmitted individual coded information signal was correct. The invention has particular utility in telephone systems wherein dial signals are transmitted by the telephone transmitter, and, if contacts associated with the oscillator producing said dial signals malfunction, cause erroneous dial signals to be transmitted.

2. State of the Prior Art

In known methods wherein individual coded information signals are successively transmitted, the individual coded message signals are scanned at regular time intervals by synchronization means employing a synchronization signal to provide an identification of the coded information signals according to their modulation characteristics. For example, coded information signals may be transmitted by amplitude modulation, frequency modulation, or phase modulation of a carrier signal, and individual modulation characteristics thereof may be employed to identify particular information signals. When successive coded information signals are transmitted irregularly such that the time intervals between successive coded information signals do not occur regularly, it is extremely difficult to scan said individual coded information signals with synchronization means, and if they are scanned relatively complicated and expensive apparatus is required. However, the irregular transmission of successive individual information signals is often desirable, as for example, when coded information signals are transmitted to selected stations by stations associated with another exchange. Therefore, it is important that individual coded information signals be accurately identified.

Further, in a data collecting system, the parallel transmission of coded information signals is particularly desirable, especially when they are produced by a keyboard since it simplifies the operation of the keyboard. Further, when telephone lines are utilized to transmit the coded information signals, the loop current associated with the exchange office may be employed to function as a power supply for an oscillator that generates the coded information signals. For example, the coded information signals may represent dial signals produced by an audio frequency oscillator for use in conjunction with push button telephones to establish a connection to the selected called subscriber. The transmission system associated with the audio frequency oscillator normally employs relatively low voltages and, consequently, the reliability of operation of the relay contacts associated with the audio frequency oscillator to selectively generate desired dial signals decreases. Thus these contacts are normally connected to the resonant circuit associated with the audio frequency oscillator, and their selective actuation determines the frequency produced thereby.

In order to detect errors resulting from malfunction of the contacts, it is known to transmit a second modulation characteristic, for example, a hold signal at a particular frequency. However, the bandwidth associated with the transmission system is consequently increased.

SUMMARY OF THE INVENTION

These and other defects of prior art systems are solved by the present invention, which provides for the transmission of a plurality of signals selected from a group of signals having different fixed frequencies, to identify particular individual coded information signals. Further, a hold signal is transmitted between successive coded information signals, which comprises a combination of signals having frequencies selected from said group of signals having fixed different frequencies. Also, at least one individual signal of a particular frequency that comprises the hold signal, is used in combination with other signals selected from the group of signals having fixed different frequencies as representative of coded information signals.

The received signals are evaluated at the receiver, and if out of two successive received signals, one is not evaluated to be a hold signal, an error indication is produced to show that an erroneous signal has been transmitted. In this regard, erroneous signals may be transmitted because of malfunction of contacts associated with an oscillator located at the transmitter, wherein selective actuation of the contacts causes signals to be produced having frequencies corresponding to the group of fixed different frequencies. Thus, the bandwidth associated with the transmission system is considerably reduced, because said individual signal of a particular frequency comprises the hold signal as well as certain coded information signals.

The invention has particular utility in telephone systems wherein an audio frequency generator is used to transmit dial signals. The coded information signals thus correspond to dial signals, and the invention is explained with reference to an illustrative example wherein two signals selected from a group of four different fixed frequencies, are simultaneously transmitted to identify individual coded information signals. Further, the hold signal transmitted between successive coded information signals also comprise a combination of two signals, selected from the group of four signals having different fixed frequencies.

DETAILED DESCRIPTION OF THE INVENTION

In systems employing the parallel transmission of coded information signals, wherein the coded information signals are produced by a keyboard and transmitted by telephone lines, it is known to transmit hold signals between successive coded information signals to inform the receiving station that a new coded information signal follows it.

Figure 1:
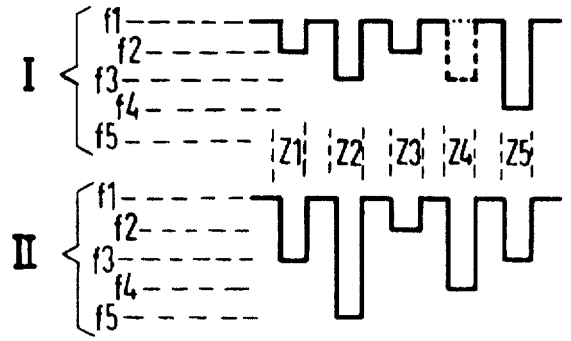
Fig. 1 PRIOR ART
FIG. 1 is a graph illustrating a prior art method.

FIG. 1 illustrates a known method for transmitting successive coded information signals. Thus signals having five different frequencies, $f1-f5$, may be selectively generated, and the simultaneous transmission of the combination of two of said five signals is used to identify a particular coded information signal. The simultaneous transmission of several frequencies in order to identify different individual coded information signals is particularly desirable where the frequency bandwidth associated with the transmission system is limited. Thus, for example, with reference to FIG. 1, two signals having frequencies selected from the two groups of frequencies, I and II, are simultaneously transmitted to identify individual coded information signals (Z1—Z5, for example). Further, the simultaneous transmission of two signals selected from frequency groups I and II identifies a hold signal, transmitted between successive coded information signals, Z1—Z5. A different combination of frequencies is transmitted to identify each individual coded information signal. Further, the hold signal is identified by the simultaneous transmission of signals at frequency *f1*.

For example, frequency *f2* associated with group I, and frequency *f3* associated with group II, are simultaneously transmitted to identify coded information signal Z1. It is not necessary that successive coded information signals, Z1—Z5, or successive hold signals be transmitted for equal time periods. However, it is essential that after coded information signals, a hold signal be transmitted.

For example, transmission of message signal Z4 is erroneous, because instead of the transmission of a signal at frequency *f3* (frequency group I), as shown by the broken lines in FIG. 1, a signal corresponding to the hold frequency *f1* is transmitted, as shown by the dotted lines of FIG. 1.

However, the error caused by the simultaneous transmission of signals at frequencies *f1* and *f4* may be evaluated at the receiver to provide an indication that received signal Z4 is inaccurate. Thus, whenever a signal at hold frequency *f1* is simultaneously transmitted with a signal at another frequency (*f2*—*f5*) the receiver can provide an error indication. However, signals at frequency *f1* cannot be employed to identify coded information signals.

Figure 2:
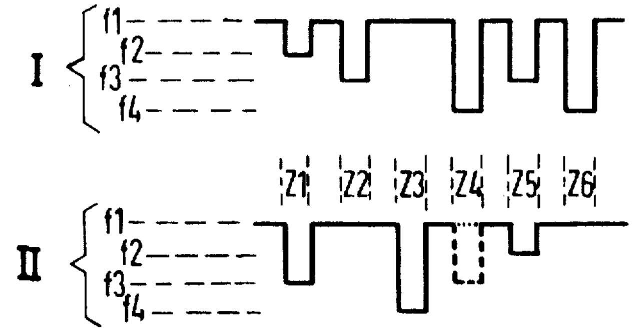
FIG. 2 is a graph illustrating the method according to the invention.

FIG. 2 shows a transmission method employing the simultaneous transmission of two signals having frequencies selected from frequencies *f1*—*f4* of frequency groups I and II. This method uses a frequency bandwidth that is narrower compared to the transmission process described with reference to FIG. 1, wherein five frequencies (*f1*—*f5*) are combined in groups of two to identify 16 possible coded information signals, because signals at frequency *f5* are not utilized. Thus, the invention provides for the transmission of signals corresponding to 16 possible frequency combinations, one of which is used to identify a hold signal. The simultaneous transmission of frequency *f1* of groups I and II thus corresponds to the hold signal. However, in the transmission method described in FIG. 2, the simultaneous transmission of a signal at frequency *f1* with a signal at a frequency of one of frequencies *f2*—*f4* is used to identify a coded information signal, and thus can no longer provide an error indication as described with reference to FIG. 1.

Thus coded information signal Z1 is correctly identified by the simultaneous transmission of signals at frequency *f2* (group I) and frequency *f3* (group II). Coded information signal Z4 is false, because instead of the transmission of a signal at frequency *f3* (group II), as shown by the broken lines of FIG. 2, a signal at frequency *f1* (group II) is transmitted, as shown by the dotted lines of FIG. 2.

However, the receiver does not recognize this error, because the simultaneous transmission of signals at frequency *f4* (group I) and frequency *f1* (group II) corresponds to a combination that is indicative of a particular coded information signal. Therefore, unlike the method as described in relation to FIG. 1, wherein the simultaneous transmission of a signal at frequency *f1* and a signal at one of frequencies *f2*—*f 5*, is indicative of an error and may be evaluated by the receiver as such, the method described in relation to FIG. 2 cannot be responsive to the simultaneous transmission of signals at frequency *f1* and one of frequencies *f2*—*f4* to provide an error indication.

Figure 3:
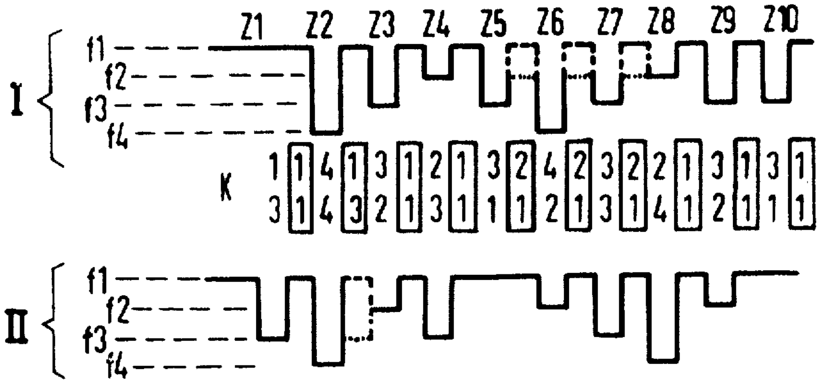
FIG. 3 is a graph and associated table showing a typical series of transmitted signals according to the invention.

However, FIG. 3 illustrates an evaluation method that may be employed by the receiver to determine when an incorrect signal has been transmitted thereto using the combination of four frequencies (*f1*—*f4*) as was described with reference to FIG. 2. Thus, first and second frequency groups I and II selectively represent which to of the four frequencies are simultaneously transmitted. Simultaneous transmission of signals at frequency *f1* corresponds to the hold condition.

In FIG. 3, Table K designates the frequencies of the two signals transmitted simultaneously at particular times. The upper series of numbers corresponds to the frequencies transmitted at selected times corresponding to group I. The lower group of numbers corresponds to the frequencies transmitted at selected times corresponding to group II. As discussed above, during the time interval between transmission of successive coded messages, signals at the combination of frequencies indicative of the hold condition (frequency *f1* of groups I and II) are transmitted. The actual respective frequencies of the first and second frequency groups I and II of the signals transmitted between successive coded information signals are shown enclosed by a block.

In the event that the transmitter oscillator malfunctions and the hold signal is not transmitted between successive coded information signals, as, for example, between coded information signals Z2 and Z3; Z5 and Z6; and Z6 and Z7, the receiver will produce a corresponding error indication. For this purpose, the receiver is provided with a logic evaluation device that evaluates two successively received signals, as, for example, signals Z2 and Z3. If one of the two successively received signals evaluated does not correspond to the transmission of a hold signal (frequency *f1* of groups I and II) this will be an indication that one of the two successively received signals is incorrect. In this event the evaluation device may apply an error indication signal to the transmitter, to activate an error indication device located at the transmitter. In this regard, the error indication device may comprise either acoustic or visual means responsive to an error indication signal applied thereto to produce a corresponding indication thereof.

According to the described process, erroneous coded information signals that are transmitted to the receiver may be detected and evaluated when said erroneously transmitted coded information signals are of time duration longer than the time duration of a hold signal condition. The receiver may comprise further error detection apparatus, if the transmitted coded information signals should theoretically follow a predetermined format, for example, wherein a predetermined number of coded information signals should be transmitted. Then, if a particular coded information signal should theoretically be transmitted, but because of transmitter malfunction, a signal corresponding to the hold condition is received by the receiver, a coded information signal will be missing from the predetermined format, and this may be detected by the evaluation device to provide a further error indication. Similarly, if the hold signal should theoretically be transmitted but the transmitter malfunctions and signals having a combination of frequencies corresponding to a coded information signal are transmitted, the evaluation device would detect that one coded information signal too many has been received. This, of course, would be indicative of a departure from the predetermined format, and would provide a further error indication.

Figure 4A:
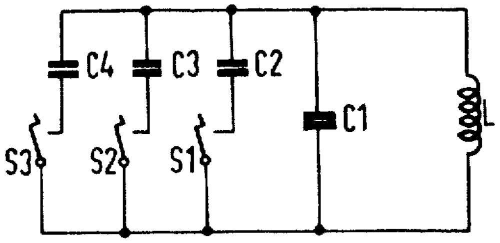
FIG. 4*a* is an electrical schematic diagram of an oscillator resonant circuit, showing how erroneous signals may be produced and transmitted.

FIG. 4*a* shows a variable resonant circuit that may be associated with the transmitter oscillator to select the frequencies of the signals simultaneously transmitted (groups I or II). In this regard, two resonant circuits would be employed to simultaneously produce signals at the correct frequencies that are to be simultaneously transmitted. Thus the resonant circuit comprises the parallel combination of inductor L and capacitor C1, with capacitors C2, C3, and C4 being selectively connected in parallel with the described parallel connection through actuation of their associated series connected contacts S1, S2, and S3, respectively, to the closed position. The probability that normally open contacts S1, S2, and S3 are not actuated to the closed position in response to control signals when this is necessary to produce the desired frequency is less than the probability that they will remain connected in the closed position and thereby connect their associated series connected capacitor in parallel with inductor L and capacitor C1 when it is desired to transmit the hold signal. In this regard, the frequency corresponding to the hold signal is produced when contacts S1, S2, and S3 are open. If one of said contacts is erroneously actuated to the closed position, or remains closed, the transmission of a signal corresponding to the hold frequency *f1* cannot be produced by the resonant circuit because its resonant frequency does not correspond to the frequency $f1$ of the hold signal. Therefore, the erroneous connection of any or all of contacts S1, S2, and S3 to the closed position when the transmitter should produce a hold signal (corresponding to the simultaneous transmission of two signals at frequency $f1$) causes signals at one of frequencies $f2$—$f4$ to be generated and therefore one of two successively transmitted signals is not a hold signal. This is evaluated by the evaluation device associated with the receiver as described above.

Figure 4B:
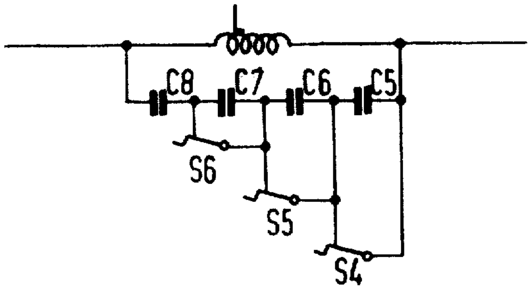
FIG. 4*b* is another electrical schematic diagram of an oscillator resonant circuit, showing how erroneous signals may be produced and transmitted.

FIG. 4*b* shows another example of a resonant circuit associated with an oscillator located at the transmitter. The resonant circuit comprises the parallel connection of inductor L and at least capacitor C8. Normally closed contacts S4, S5, and S6 are connected to short circuit capacitors C5, C6, and C7, respectively, when actuated to their closed positions. When contacts S4, S5, and S6 are open, they cause the series connection of capacitors C5, C6, and C7, respectively, and capacitor C8, to be connected in parallel with inductor L. Signals at frequency $f1$ are produced by the described resonant circuit, when contacts S4, S5, and S6 are closed, and thereby short-circuit the series connection of capacitors C5, C6, and C7. If one of said contacts is not actuated to the closed position when the transmitter should theoretically be transmitting a signal corresponding to the hold signal, the frequency of the actual signal transmitted by the transmitter is incorrect, and the hold signal is not transmitted between two successive coded information signals. Therefore the evaluation device located at the receiver will produce a corresponding error indication.

With reference to the circuit shown in FIG. 4*b*, the probability that contacts S4, S5, and S6 are not actuated to the open position in response to corresponding control signals is very slight, compared to the greater probability that they will not function to complete the connection to short-circuit their associated capacitors, when in rest position.

The contacts illustrated in FIGS. 4*a* and 4*b* are switching devices which may not be properly actuated from their normal rest positions. However, the probability of errors due to improper actuation of the contacts from their rest position is normally less than the probability that they will malfunction when theoretically in the rest position. Thus, with reference to FIGS. 4*a* and 4*b*, the greater probability of error is associated with the position of the contacts when the hold signal frequency is to be transmitted, and the invention is, therefore, particularly concerned with evaluating successively received signals to determine if a hold signal is actually transmitted between successive coded information signals.

Figure 5:
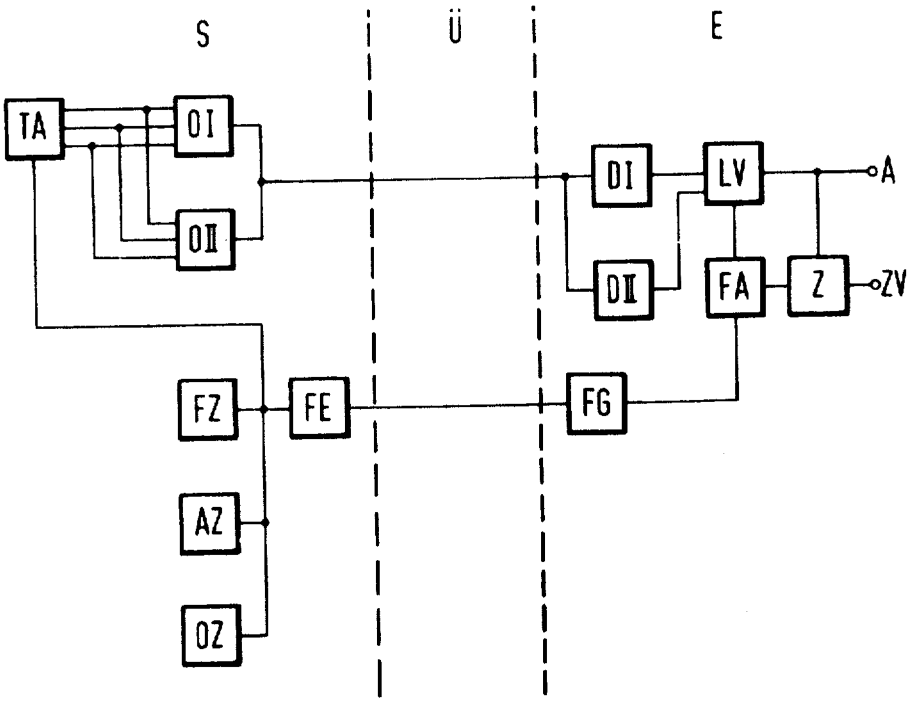
FIG. 5 is a block diagram of a circuit arrangement which is exemplary of the circuitry in which the method and apparatus of this invention may be used.

FIG. 5 is a block diagram of a telecommunication transmission system which operates according to the principles of the invention described herein and which uses the input circuitry illustrated in FIG. 4*a* or FIG. 4*b*. It is noted that each of the individual elements illustrated in FIG. 5 are in and of themselves old and well known to those skilled in the art, but it is through the combination of said elements as taught herein that the desired results discussed hereinabove are achieved.

Transmitting station S contains a keyboard TA which, in the well-known manner, permits manual selection of the desired coded information signal. The contacts on keyboard TA selects the frequencies to be generated by each of the two oscillators OI and OII. Oscillator OI generates frequency group I ($f1$—$f4$), and oscillator OII generates frequency group II ($f1$—$f4$). This, with every actuation of keyboard TA two different frequencies are transmitted, whereby one originates from frequency group I and one originates from frequency group II. The oscillators O may be of any of the well known types suitable for the application described herein.

As was outlined hereinabove with respect to FIGS. 4*a* and 4*b*, either rest contacts or operating contacts can be used in the keyboard TA. Contacts S1 to S3 (if the FIG. 4*a* embodiment is used) or contacts S4 to S6 (if the FIG. 4*b* embodiment is used) are physically placed in keyboard TA. The resonant circuit with elements L and C1 (or L and C5 to C8) may be found in each of the oscillators OI and OII. It logically follows, therefore, that the resonant circuitry according to either FIG. 4*a* or FIG. 4*b* is present in pairs in each of the aforementioned oscillators. However, the contacts are each singly placed in the keyboard so that each contact controls both oscillators. It, of course, is easily possible to directly install the oscillators in the keyboard.

In this illustrative example, the signals are frequency modulated, but it is to be remembered, as pointed out hereinabove, that other forms of modulation may be used, e.g. phase modulation or amplitude modulation. The two modulation characteristics, one from each frequency group, are communicated to a receiving station E via transmission paths U. There is available in the receiving station a demodulator DI for frequency group I and a second demodulator DII for frequency group II. Of course, the type of demodulator used will vary with the type of modulation used, and this choice is well within the knowledge of those skilled in the art. The output voltages of the demodulators are connected to a logical connection circuit LV, which in each case compares two successive signals, i.e. a signal and a rest condition, with each other. Alternatively, the two successive signals may be compared with the rest condition stored in the logical connection circuit LV. If in a particular signal the fixed rest condition appears, the signal is transmitted to outlet terminal A where a writing device, for example a printer or a teleprinter, may be connected. If the rest condition is not contained in the two successive signals, the connection circuit LV transmits a signal to an error indication device FA. Any suitable indication device may be used. By this means, a faulty transmission is recognized.

A number of different circuit arrangement may be developed based on the principles described hereinabove. In the circuit arrangement in FIG. 5 the error indication device, FA, triggers an error signal generator FG which for a short period of time transmits a predetermined frequency back to transmitting station S. Transmitting station S contains an error signal receiver FE, which responds upon the reception of the transmitted frequency to actuate an error indication device FZ. At the same time, there occurs, for example, an acoustical indication AZ as well as an optical indication OZ. These indicating devices may, of course, be any of the well known types readily available. Further, the error signal transmitted by error signal generator FG may be conducted to and utilized to block keyboard TA so that further signal transmission is not possible. When an error is noted in any one of the foregoing manners, the faultily transmitted signals must again be transmitted. Additionally, it would be possible without difficulty in a telephone connection existing along with the transmission path to communicate, by voice to an operator, that the transmission was faulty and that a part of the message must be repeated.

The input error recognition technique described hereinabove, may be further modified to permit the counting of signals. If, for example, a teleprinter is connected to an output terminal A, the number of signals printed in one line is fixed. A counter Z may be used to count the signals in one line. With each line advance of the teleprinter, the counter will receive over line ZV, the line advance impulse. The counter will then be set. If, at the time of stopping, a predetermined counter indication has not be released, or has been exceeded, the counter will transmit a signal to the error indication device FA, which triggers the error signal generator in the above described manner.

I claim:

1. A method for determining the correctness of coded information signals produced by a transmitter comprising:
- transmitting successive individual coded information signals identified by the simultaneous transmission of at least two predetermined signals (group I, group II) selected from a group of signals ($f1$—$f4$) of different frequencies to a receiver;
- transmitting hold signals identified by the simultaneous transmission of at least two predetermined signals ($f1$) each of which may be simultaneously transmitted with other signals selected from the group of signals of different frequencies to identify individual coded information signals to the receiver;

evaluating received signals;

producing an error indicating signal when the transmitted coded information signals are evaluated to be incorrect.

2. The method recited in claim 1 further comprising:

applying the error indicating signal to the transmitter;

indicating at the transmitter the application thereto of an error indicating signal.

3. The method recited in claim 2 further comprising:

blocking the transmission of further coded information signals when an error indicating signal is applied to the transmitter.

4. The method recited in claim 1 further comprising:

transmitting a series of coded information signals corresponding to a predetermined format;

producing an error indicating signal when the received coded information signals deviate from the predetermined format.

5. The method recited in claim 4 further comprising:

transmitting a predetermined number of coded information signals corresponding to the predetermined format;

counting the received coded information signals;

producing an error indicating signal when the counted received coded information signals do not correspond to the predetermined number.

6. The method recited in claim 5 further comprising:

applying the error indicating signal to the transmitter;

indicating at the transmitter the application thereto of an error indicating signal.

7. The method recited in claim 2 further comprising:

indicating acoustically at the transmitter the application of an error indicating signal.

8. The method recited in claim 7 further comprising:

indicating visually at the transmitter the application of an error indicating signal.

9. A method for determining the correctness of transmitted individual coded information signals comprising:

transmitting successive individual coded information signals identified by the simultaneous transmission of at least two predetermined signals (group I, group II) selected from a group of signals ($f1-f4$) of different frequencies to a receiver;

transmitting hold signals identified by the simultaneous transmission of at least two predetermined signals ($f1$) each of which may be simultaneously transmitted with other signals ($f2-f4$) selected from the group of signals of different frequencies ($f1-f4$) to identify individual coded information signals to the receiver;

evaluating a series of two successively received signals;

producing an error indicating signal at the receiver when one of the two successively received signals of the series is not evaluated to be a hold signal.

10. The method recited in claim 9 further comprising:

applying the error indicating signal to the transmitter;

indicating at the transmitter the application thereto of an error indicating signal.

11. The method recited in claim 10 further comprising:

blocking the transmission of further coded information signals when an error indicating signal is applied to the transmitter.

12. In a telecommunication system for the transmission of coded message signals, each of which comprises one of at least two groups of predetermined modulation characteristics whereby between each message signal, as well as in pauses between transmissions, a rest signal consisting of one modulation characteristic of each of the at least two groups of modulation characteristics is transmitted, and wherein in the transmission system there is, for each modulation characteristic, a transmission contact, and in the receiving system there is a supervisory system for carrying out a check for contact errors of the transmission contacts on the transmission side through supervision of the modulation characteristics of the received signals, and having a signalling means adapted to be actuated upon the determination of an error, the improvement comprising:

means connecting the transmission contacts for message signals pertaining to a group of modulation characteristics with one another in a circuit so that the transmitter for the modulation characteristics of this group is actuated only for the rest signal when all transmission contacts are in their normal positions, and in such a way that for the existence of a contact error the transmission contact of another modulation characteristic is activated, and a receiver means having therein a supervisory system for evaluating the rest signals received between message signals, said supervisory systems including means for producing an error signal when at least one modulation characteristic assigned to a message signal is sent to thereby indicate erroneous transmission contact operation.

13. The circuit arrangement according to claim 12, wherein:

said transmission contacts are arranged so that in each case after assignment of a modulation characteristic, said contacts return to the rest position and connect the modulation characteristics corresponding to the rest condition to the transmission path, said contacts being in an operative position upon the occurrence of disturbances in the transmission contacts whereby the modulation characteristics corresponding to the rest condition will no longer be communicated to the transmission path, and further comprising:

a logical connection circuit in said receiver means which evaluates two directly successive signals, of which one must correspond to the rest condition, and means for transmitting an error indication signal in the absence of a rest condition.

14. The circuit arrangement according to claim 13 having a means for reproducing an error indication signal upon the sensing of a disturbance by the logical connection circuit and means for providing an indication responsive to said error indication signal.

15. The circuit arrangement according to claim 13, wherein said transmission contacts produce a rest signal when all of said contacts are in an open condition.

16. The circuit arrangement according to claim 14, wherein said transmission contacts produce a rest signal when all of said contacts are closed.

17. The circuit arrangement according to claim 14 comprising in addition a counter means for counting the number of signals transmitted in a predetermined format as said signals are received and for producing an error indication when said count varies from a predetermined value.